United States Patent
Clark et al.

(10) Patent No.: US 8,595,438 B1
(45) Date of Patent: Nov. 26, 2013

(54) SYSTEM AND METHOD FOR IMPROVING CACHE PERFORMANCE

(75) Inventors: Roy E. Clark, Hopkinton, MA (US); Randall H. Shain, Wrentham, MA (US)

(73) Assignee: EMC Corporation, Hopkinton, MA (US)

( * ) Notice: Subject to any disclaimer, the term of this patent is extended or adjusted under 35 U.S.C. 154(b) by 483 days.

(21) Appl. No.: 12/895,053

(22) Filed: Sep. 30, 2010

(51) Int. Cl.
*G06F 12/08* (2006.01)

(52) U.S. Cl.
USPC ............ 711/118; 711/113; 711/119

(58) Field of Classification Search
USPC .................. 711/118, 113, 119
See application file for complete search history.

(56) References Cited

U.S. PATENT DOCUMENTS

| 7,577,787 B1 * | 8/2009 | Yochai et al. ............ 711/113 |
| 2002/0078299 A1 * | 6/2002 | Chiou et al. ............ 711/119 |

* cited by examiner

*Primary Examiner* — Yong Choe
(74) *Attorney, Agent, or Firm* — Brian J. Colandreo; Mark H. Whittenberger; Holland & Knight LLP

(57) ABSTRACT

A method, computer program product, and computing system for monitoring an actual read/write ratio for a cache memory system. The operation of the cache memory system may be adjusted to reduce the difference between a target read/write ratio for the cache memory system and the actual read/write ratio of the cache memory system.

21 Claims, 3 Drawing Sheets

SYSTEM AND METHOD FOR IMPROVING CACHE PERFORMANCE

TECHNICAL FIELD

This disclosure relates to cache memory systems and, more particularly, to systems and methods for improving the performance of cache memory systems.

BACKGROUND

Storing and safeguarding electronic data is of paramount importance in modern business. Accordingly, various systems may be employed to protect such electronic data.

The use of solid-state storage devices is increasing in popularity. A solid state storage device is a data storage device that uses solid-state memory to store persistent data. A solid-state storage device may emulate (and therefore replace) a conventional hard disk drive. Additionally/alternatively, a solid state storage device may be used within a cache memory system. With no moving parts, a solid-state storage device largely eliminates (or greatly reduces) seek time, latency and other electromechanical delays and failures associated with a conventional hard disk drive.

SUMMARY OF DISCLOSURE

In a first implementation, a computer implemented method includes monitoring an actual read/write ratio for a cache memory system. The operation of the cache memory system may be adjusted to reduce the difference between a target read/write ratio for the cache memory system and the actual read/write ratio of the cache memory system.

One or more of the following features may be included. The cache memory system may be a non-volatile, solid-state, cache memory system. The target read/write ratio may be defined for the cache memory system. Adjusting the operation of the cache memory system may include adjusting the number of cache writes to the cache memory system. Monitoring an actual read/write ratio for a cache memory system may include monitoring an actual read/write ratio for a cache memory system for a defined period of time. The defined period of time may be within the range of one minute to one day. The target read/write ratio may be within the range of 75% and 125%.

In another implementation, a computer program product resides on a computer readable medium that has a plurality of instructions stored on it. When executed by a processor, the instructions cause the processor to perform operations including monitoring an actual read/write ratio for a cache memory system. The operation of the cache memory system may be adjusted to reduce the difference between a target read/write ratio for the cache memory system and the actual read/write ratio of the cache memory system.

One or more of the following features may be included. The cache memory system may be a non-volatile, solid-state, cache memory system. The target read/write ratio may be defined for the cache memory system. Adjusting the operation of the cache memory system may include adjusting the number of cache writes to the cache memory system. Monitoring an actual read/write ratio for a cache memory system may include monitoring an actual read/write ratio for a cache memory system for a defined period of time. The defined period of time may be within the range of one minute to one day. The target read/write ratio may be within the range of 75% and 125%.

In another implementation, a computing system includes at least one processor and at least one memory architecture coupled with the at least one processor. A first software module is executed on the at least one processor and the at least one memory architecture. The first software module is configured to perform operations including monitoring an actual read/write ratio for a cache memory system. A second software module is executed on the at least one processor and the at least one memory architecture. The second software module is configured to perform operations including adjusting the operation of the cache memory system to reduce the difference between a target read/write ratio for the cache memory system and the actual read/write ratio of the cache memory system.

One or more of the following features may be included. The cache memory system may be a non-volatile, solid-state, cache memory system. The target read/write ratio may be defined for the cache memory system. Adjusting the operation of the cache memory system may include adjusting the number of cache writes to the cache memory system. Monitoring an actual read/write ratio for a cache memory system may include monitoring an actual read/write ratio for a cache memory system for a defined period of time. The defined period of time may be within the range of one minute to one day. The target read/write ratio may be within the range of 75% and 125%.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

Figure 1:
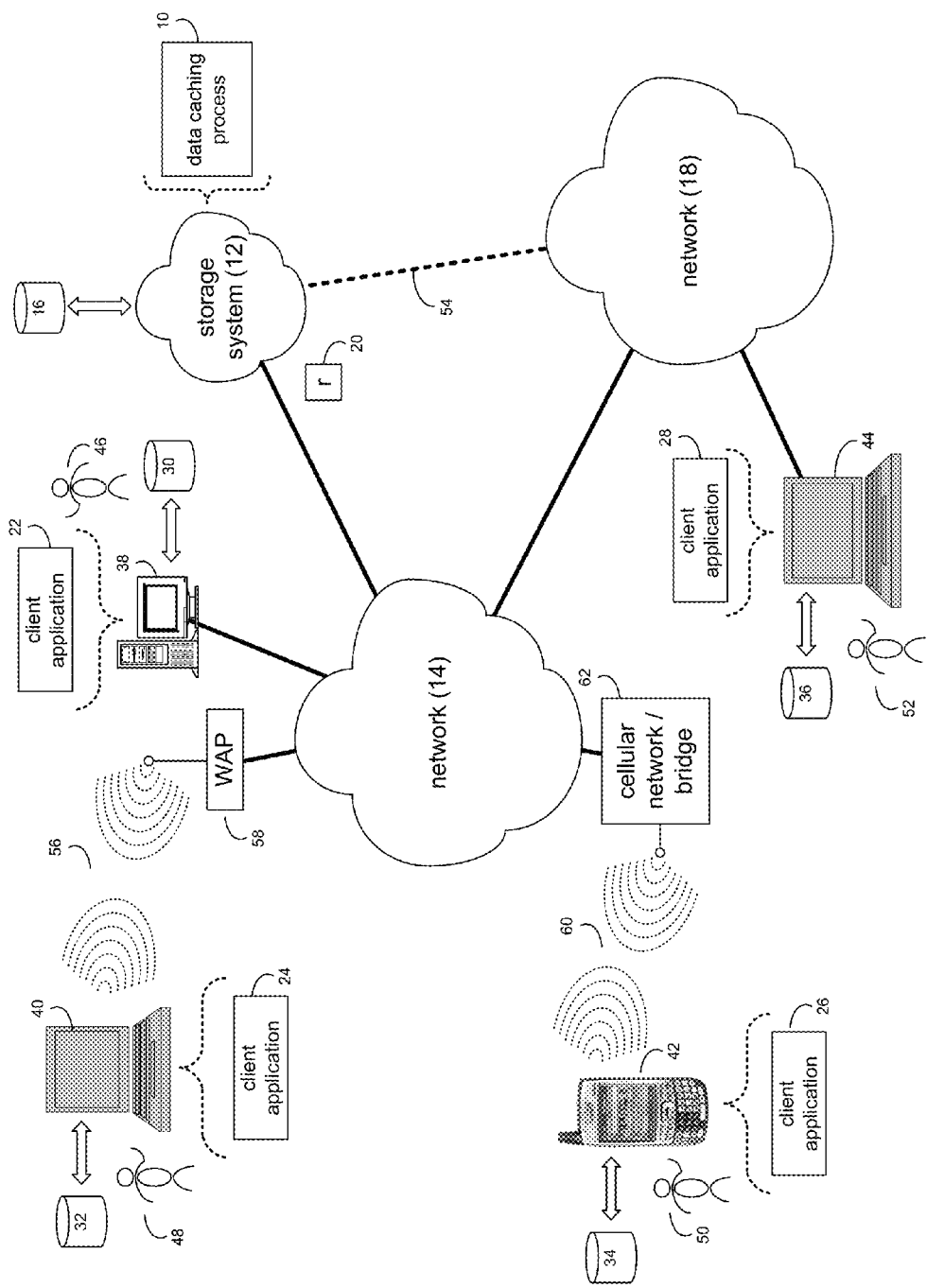
FIG. 1 is a diagrammatic view of a storage system and a data caching process coupled to a distributed computing network.

As will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present disclosure is described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

System Overview:

Referring to FIG. 1, there is shown data caching process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft Windows XP Server™; Novell Netware™; Redhat Linux™, Unix, or a custom operating system, for example.

As will be discussed below in greater detail, data caching process 10 may monitor an actual read/write ratio for a cache memory system. Data caching process 10 may adjust the operation of the cache memory system to reduce the difference between a target read/write ratio for the cache memory system and the actual read/write ratio of the cache memory system.

The instruction sets and subroutines of data caching process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); and a read-only memory (ROM).

Network 14 may be connected to one or more secondary networks (e.g., network 18), examples of which may include but are not limited to: a local area network; a wide area network; or an intranet, for example.

Various data requests (e.g. data request 20) may be sent from client applications 22, 24, 26, 28 to storage system 12. Examples of data request 20 may include but are not limited to data write requests (i.e. a request that data be written to storage system 12) and data read requests (i.e. a request that data be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, personal digital assistant 42, notebook computer 44, a server (not shown), a data-enabled, cellular telephone (not shown), and a dedicated network device (not shown).

As discussed above, examples of storage system 12 may include, but are not limited to: a Network Attached Storage (NAS) system, a Storage Area Network (SAN), a personal computer with a memory system, a server computer with a memory system, and a cloud-based device with a memory system. Accordingly, storage system 12 (as described above, as described below, or in a simpler form (e.g., a single hard drive without redundancy) may be included within any of a variety of devices. For example, storage system 12 may be e.g., a memory system within a desktop computer having a single hard drive, a RAID controller card within a server computer that controls multiple hard drives, a memory system within a stand-alone network attached storage device, a memory system within a laptop computer, a memory system within a smart phone, or a cache system included within a hard disk drive.

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, Wi-Fi, and/or Bluetooth device that is capable of establishing wireless communication channel 56 between laptop computer 40 and WAP 58. Personal digital assistant 42 is shown wirelessly coupled to network 14 via wireless communication channel 60 established between personal digital assistant 42 and cellular network/bridge 62, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

Client electronic devices 38, 40, 42, 44 may each execute an operating system, examples of which may include but are not limited to Microsoft Windows™, Microsoft Windows CE™, Redhat Linux™, or a custom operating system.

The Data Caching Process:

For the following discussion, client application 22 is going to be described for illustrative purposes. However, this is not intended to be a limitation of this disclosure, as other client applications (e.g., client applications 24, 26, 28) may be equally utilized.

For illustrative purposes, storage system 12 will be described as being a network-based storage system that includes a plurality of electro-mechanical backend storage devices. However, this is for illustrative purposes only and is not intended to be a limitation of this disclosure, as other configurations are possible and are considered to be within the scope of this disclosure. For example and as discussed above, storage system 12 may be a personal computer that includes a single electro-mechanical storage device.

Figure 2:
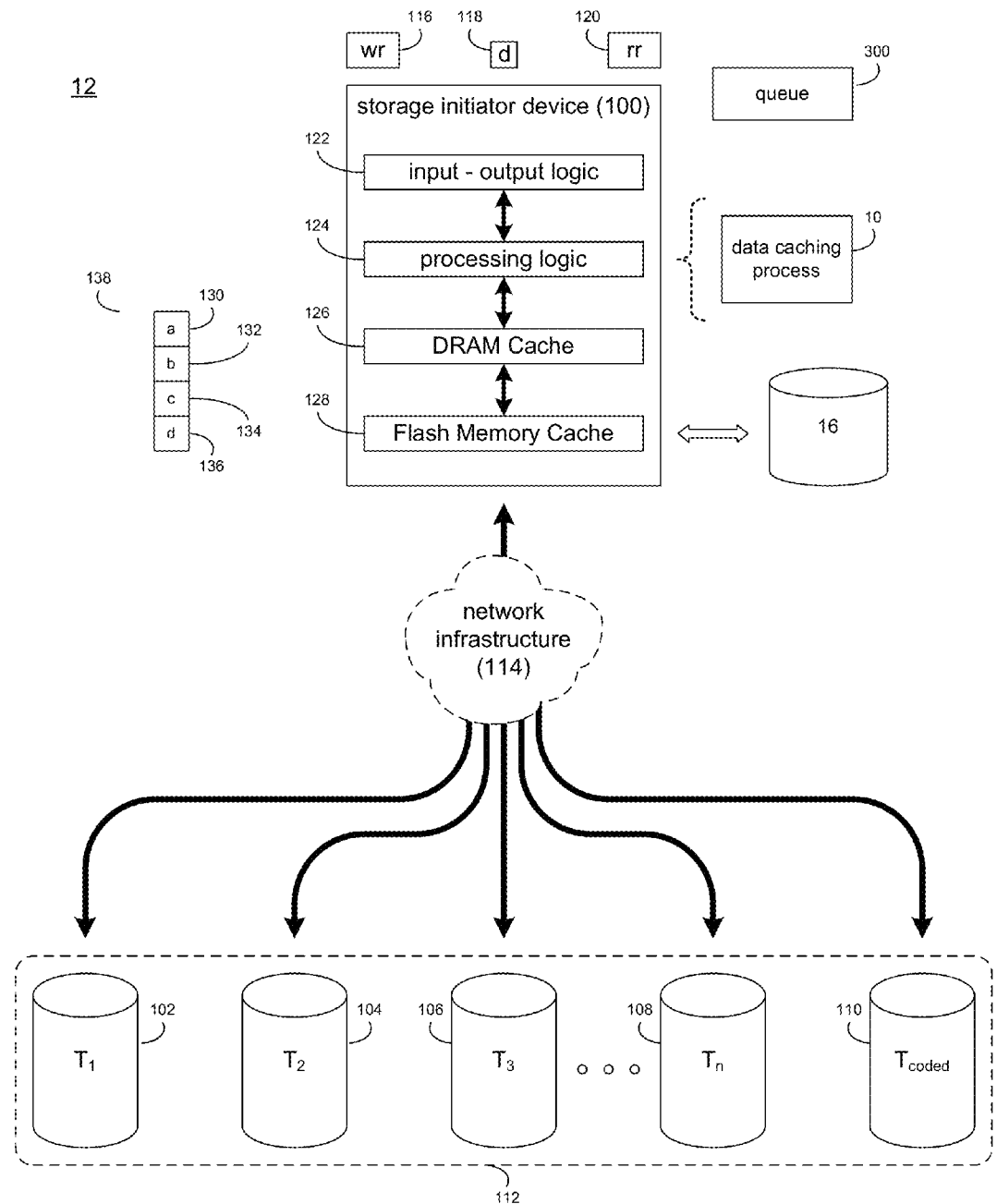
FIG. 2 is a diagrammatic view of the storage system of FIG. 1.

Referring also to FIG. 2, storage system 12 may include a storage initiator device (e.g. storage initiator device 100), and a plurality of storage targets $T_{1-n}$ (e.g. storage targets 102, 104, 106, 108). Storage targets 102, 104, 106, 108 may be configured to provide various levels of performance and/or high availability. For example, one or more of storage targets 102, 104, 106, 108 may be configured as a RAID 0 array, in which data is striped across storage targets. By striping data across a plurality of storage targets, improved performance may be realized. However, RAID 0 arrays do not provide a level of high availability. Additionally/alternatively, one or more of storage targets 102, 104, 106, 108 may be configured as a RAID 1 array, in which data is mirrored between storage targets. By mirroring data between storage targets, a level of high availability is achieved as multiple copies of the data are stored within storage system 12.

While storage targets 102, 104, 106, 108 are discussed above as being configured in a RAID 0 or RAID 1 array, this is for illustrative purposes only and is not intended to be a limitation of this disclosure, as other configurations are possible. For example, storage targets 102, 104, 106, 108 may be configured as a RAID 3, RAID 4, RAID 5 or RAID 6 array.

While in this particular example, storage system 12 is shown to include four storage targets (e.g. storage targets 102, 104, 106, 108), this is for illustrative purposes only and is not intended to be a limitation of this disclosure. Specifically, the actual number of storage targets may be increased or decreased depending upon e.g. the level of redundancy/performance/capacity required.

Storage system 12 may also include one or more coded targets 110. As is known in the art, a coded target may be used to store coded data that may allow for the regeneration of data lost/corrupted on one or more of storage targets 102, 104, 106, 108. An example of such a coded target may include but is not limited to a hard disk drive that is used to store parity data within a RAID array.

While in this particular example, storage system 12 is shown to include one coded target (e.g., coded target 110), this is for illustrative purposes only and is not intended to be a limitation of this disclosure. Specifically, the actual number of coded targets may be increased or decreased depending upon e.g. the level of redundancy/performance/capacity required.

A combination of storage targets 102, 104, 106, 108 and coded target 110 may form non-volatile, electro-mechanical memory system 112.

The manner in which storage system 12 is implemented may vary depending upon e.g. the level of redundancy/performance/capacity required. For example, storage system 12 may be a RAID device in which storage initiator device 100 is a RAID controller card and storage targets 102, 104, 106, 108 and/or coded target 110 are individual "hot-swappable" hard disk drives. An example of such a RAID device may include but is not limited to an NAS device. Alternatively, storage system 12 may be configured as a SAN, in which storage initiator device 100 may be e.g., a server computer and each of storage targets 102, 104, 106, 108 and/or coded target 110 may be a RAID device and/or computer-based hard disk drive. Further still, one or more of storage targets 102, 104, 106, 108 and/or coded target 110 may be a SAN.

In the event that storage system 12 is configured as a SAN, the various components of storage system 12 (e.g. storage initiator device 100, storage targets 102, 104, 106, 108, and coded target 110) may be coupled using network infrastructure 114, examples of which may include but are not limited to an Ethernet (e.g., Layer 2 or Layer 3) network, a fiber channel network, an InfiniBand network, or any other circuit switched/packet switched network.

Storage initiator device 100 may execute all or a portion of data caching process 10. The instruction sets and subroutines of data caching process 10, which may be stored on a storage device (e.g., storage device 16) coupled to storage initiator device 100, may be executed by one or more processors (not shown) and one or more memory architectures (not shown) included within storage initiator device 100. Storage device 16 may include but is not limited to: a hard disk drive; a tape drive; an optical drive; a RAID device; a random access memory (RAM); and a read-only memory (ROM).

As discussed above, various data requests (e.g. data request 20) may be sent from client applications 22, 24, 26, 28 to storage system 12, and examples of data request 20 may include but are not limited to data write request 116 (i.e. a request that data extent 118 be written to storage system 12) and data read request 120 (i.e. a request that data extent 118 be read from storage system 12).

As will be discussed below in greater detail, storage initiator device 100 may include input-output logic 122 (e.g., a network interface card), processing logic 124, volatile, solid-state, cache memory system 126 (e.g., a dynamic RAM cache memory system), and non-volatile, solid-state, cache memory system 128 (e.g., a flash-based, cache memory system).

During operation of storage initiator device 100, data (e.g. data extent 118) to be written to storage system 12 may be received by input-output logic 122 (e.g. from network 14 and/or network 18) and processed by processing logic 124. As will be discussed below in greater detail, processing logic 124 may initially store data extent 118 within volatile, solid-state, cache memory system 126, and may subsequently destage data extent 118 to non-volatile, solid-state, cache memory system 128 by gathering a plurality of data extents (e.g., data extent 118) within volatile, solid-state, cache memory system 126, apportioning the data extents into a plurality of data elements (e.g., data elements 130, 132, 134, 136), and destaging this plurality of data elements (e.g., data elements 130, 132, 134, 136) as a single data segment (e.g., data segment 138) to non-volatile, solid-state, cache memory system 128. Processing logic 124 may then destage data segment 138 to the storage targets (e.g. storage targets 102, 104, 106, 108) included within non-volatile, electromechanical memory system 112. Additionally, processing logic 124 may calculate and store coded data on coded target 110 (included within non-volatile, electromechanical memory system 112) that may allow for the regeneration of data lost/corrupted on one or more of storage targets 102, 104, 106, 108.

While not as fast as volatile, solid-state, cache memory system 126, non-volatile, solid-state, cache memory system 128 may be considerably quicker than non-volatile, electro-mechanical memory system 112. Accordingly, non-volatile, solid-state, cache memory system 128 may be sized so that the number of times that non-volatile, electromechanical memory system 112 is accessed may be reduced. Accordingly, by sizing non-volatile, solid-state, cache memory system 128 so that non-volatile, solid-state, cache memory system 128 retains a quantity of data sufficient to satisfy a significant quantity of data requests (e.g., data request 20), the overall performance of storage system 12 may be enhanced.

Figure 3:
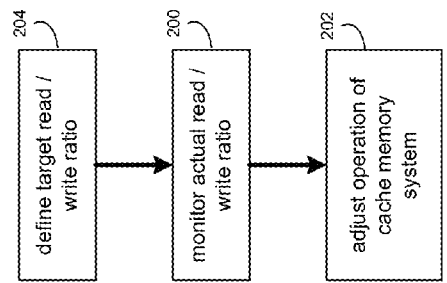
FIG. 3 is a flowchart of the data caching process of FIG. 1.

Referring also to FIG. 3 and as discussed above, data caching process 10 may monitor 200 an actual read/write ratio for a cache memory system (e.g., non-volatile, solid-state, cache memory system 128). Data caching process 10 may adjust 202 the operation of the cache memory system (e.g., non-volatile, solid-state, cache memory system 128) to reduce the difference between a target read/write ratio for the cache memory system (e.g., non-volatile, solid-state, cache memory system 128) and the actual read/write ratio of the cache memory system.

For example, whenever a read request (e.g., read request 120) is received concerning non-volatile, solid-state, cache memory system 128, data caching process 10 may examine non-volatile, solid-state, cache memory system 128 to determine if the requested data is present within non-volatile, solid-state, cache memory system 128.

If data caching process 10 determines that the requested data is present (i.e., a cache hit) within non-volatile, solid-state, cache memory system 128, data caching process 10 may read the requested data from non-volatile, solid-state, cache memory system 128. Data caching process 10 may count this operation as a cache read operation when determining the actual read/write ratio for non-volatile, solid-state, cache memory system 128.

If data caching process 10 determines that the requested data is not present (i.e., a cache miss) within non-volatile, solid-state, cache memory system 128, data caching process 10 may read the requested data from non-volatile, electro-mechanical memory system 112 and write the requested data that was retrieved from non-volatile, electro-mechanical memory system 112 to non-volatile, solid-state, cache memory system 128. Data caching process 10 may count this operation as a cache write operation when determining the actual read/write ratio for non-volatile, solid-state, cache memory system 128.

Further, whenever a write request (e.g., write request 116) is received concerning non-volatile, solid-state, cache memory system 128, data caching process 10 may write the provided data to non-volatile, solid-state, cache memory system 128. Data caching process 10 may count this operation as a cache write operation when determining the actual read/write ratio for non-volatile, solid-state, cache memory system 128.

Data caching process 10 may use the above-described information (e.g., the number of cache read operations that occur due to read request cache hits; the number of cache write operations that occur due to read request cache misses; and the number of cache write operations that occur due to write requests) to determine the actual read/write ratio for non-volatile, solid-state, cache memory system 128). As discussed above, data caching process 10 may monitor 200 this actual read/write ratio for non-volatile, solid-state, cache memory system 128.

Data caching process 10 may allow the target read/write ratio to be defined 204 (e.g., by a user) for non-volatile, solid-state, cache memory system 128. A typical example of such a target read/write ratio may be within the range of 75% and 125%. As discussed above, data caching process 10 may monitor 200 the actual read/write ratio for non-volatile, solid-state, cache memory system 128 and may adjust 202 the operation of non-volatile, solid-state, cache memory system 128 to reduce the difference between the target read/write ratio defined 204 for non-volatile, solid-state, cache memory system 128 and the actual read/write ratio of non-volatile, solid-state, cache memory system 128.

Assume for illustrative purposes that the target read/write ratio is 100%, in that the number of cache reads made on non-volatile, solid-state, cache memory system 128 ideally should match the number of cache writes made on non-volatile, solid-state, cache memory system 128. Further assume that the actual read/write ratio (as calculated in the manner discussed above) is 80%, in that only eight cache reads are made on non-volatile, solid-state, cache memory system 128 for each ten cache writes that are made on non-volatile, solid-state, cache memory system 128.

Accordingly, data caching process 10 may adjust 202 the operation of non-volatile, solid-state, cache memory system 128 to reduce the difference between the target read/write ratio defined 204 for non-volatile, solid-state, cache memory system 128 and the actual read/write ratio of non-volatile, solid-state, cache memory system 128. This may be accomplished by decreasing the number of cache writes made upon non-volatile, solid-state, cache memory system 128. Accordingly, when data caching process 10 adjusts 202 the operation of non-volatile, solid-state, cache memory system 128, data caching process 10 may adjust downward the number of cache writes made to non-volatile, solid-state, cache memory system 128.

Continuing with the above-stated example in which the actual read/write ratio (as calculated in the manner discussed above) is too low (e.g., 80% versus the target ratio of 100%), data caching process 10 may adjust 202 the operation of non-volatile, solid-state, cache memory system 128 to reduce the number of cache write operations by having data written directly to non-volatile, electro-mechanical memory system 112 (thus avoiding a cache write operation). Accordingly, by reducing the number of cache write operations, the actual read/write ratio calculated by data caching process 10 may increase toward the target ratio of 100%.

Conversely, in the event that the actual read/write ratio (as calculated in the manner discussed above) is 120% (i.e., twelve cache reads are made on non-volatile, solid-state, cache memory system 128 for each ten cache writes that are made on non-volatile, solid-state, cache memory system 128), data caching process 10 may adjust 202 the operation of non-volatile, solid-state, cache memory system 128 to decrease the number of cache reads made upon non-volatile, solid-state, cache memory system 128. This may be accomplished by having data read directly from non-volatile, electro-mechanical memory system 112 (thus avoiding a cache read operation). Accordingly, by reducing the number of cache read operations, the actual read/write ratio calculated by data caching process 10 may decrease toward the target ratio of 100%.

When monitoring 200 the actual read/write ratio for non-volatile, solid-state, cache memory system 128, data caching process 10 may monitor the actual read/write ratio for a defined period of time (T). Example of such a defined period of time (T) may include a time period within the range of one minute to one day. Further, data caching process 10 may adjust 202 the operation of non-volatile, solid-state, cache memory system 128 each time that such a defined period of time expires.

As will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer implemented method comprising:
   monitoring an actual read/write ratio for a cache memory system, wherein the actual read/write ratio for the cache memory system includes a number of cache reads to the cache memory system for each number of cache writes to the cache memory system; and
   adjusting an operation of the cache memory system to reduce a difference between a target read/write ratio for the cache memory system and the actual read/write ratio of the cache memory system.

2. The computer implemented method of claim 1 wherein the cache memory system is a non-volatile, solid-state, cache memory system.

3. The computer implemented method of claim 1 further comprising:
   defining the target read/write ratio for the cache memory system.

4. The computer implemented method of claim 1 wherein adjusting the operation of the cache memory system includes:
   adjusting the number of cache writes to the cache memory system.

5. The computer implemented method of claim 1 wherein monitoring the actual read/write ratio for the cache memory system includes:

monitoring the actual read/write ratio for the cache memory system for a defined period of time.

6. The computer implemented method of claim 5 wherein the defined period of time is within a range of one minute to one day.

7. The computer implemented method of claim 1 wherein the target read/write ratio is within a range of 75% and 125%.

8. A computer program product residing on a non-transitory computer readable medium having a plurality of instructions stored thereon which, when executed by a processor, cause the processor to perform operations comprising:
monitoring an actual read/write ratio for a cache memory system, wherein the actual read/write ratio for the cache memory system includes a number of cache reads to the cache memory system for each number of cache writes to the cache memory system; and
adjusting an operation of the cache memory system to reduce a difference between a target read/write ratio for the cache memory system and the actual read/write ratio of the cache memory system.

9. The computer program product of claim 8 wherein the cache memory system is a non-volatile, solid-state, cache memory system.

10. The computer program product of claim 8 further comprising instructions for performing operations including:
defining the target read/write ratio for the cache memory system.

11. The computer program product of claim 8 wherein adjusting the operation of the cache memory system includes:
adjusting the number of cache writes to the cache memory system.

12. The computer program product of claim 8 wherein monitoring the actual read/write ratio for the cache memory system includes:
monitoring the actual read/write ratio for the cache memory system for a defined period of time.

13. The computer program product of claim 12 wherein the defined period of time is within a range of one minute to one day.

14. The computer program product of claim 8 wherein the target read/write ratio is within a range of 75% and 125%.

15. A computing system comprising:
at least one processor;
at least one memory architecture coupled with the at least one processor;
a first module executed on the at least one processor and the at least one memory architecture, wherein the first software module is configured to perform operations including monitoring an actual read/write ratio for a cache memory system, wherein the actual read/write ratio for the cache memory system includes a number of cache reads to the cache memory system for each number of cache writes to the cache memory system; and
a second module executed on the at least one processor and the at least one memory architecture, wherein the second software module is configured to perform operations including adjusting an operation of the cache memory system to reduce a difference between a target read/write ratio for the cache memory system and the actual read/write ratio of the cache memory system.

16. The computing system of claim 15 wherein the cache memory system is a non-volatile, solid-state, cache memory system.

17. The computing system of claim 15 further comprising instructions for performing operations including:
defining the target read/write ratio for the cache memory system.

18. The computing system of claim 15 wherein adjusting the operation of the cache memory system includes:
adjusting the number of cache writes to the cache memory system.

19. The computing system of claim 15 monitoring the actual read/write ratio for the cache memory system includes:
monitoring the actual read/write ratio for the cache memory system for a defined period of time.

20. The computing system of claim 19 wherein the defined period of time is within a range of one minute to one day.

21. The computing system of claim 15 wherein the target read/write ratio is within a range of 75% and 125%.

* * * * *